(12) United States Patent
Casebolt

(10) Patent No.: US 8,938,864 B2
(45) Date of Patent: Jan. 27, 2015

(54) CONNECTOR

(71) Applicant: D B Industries, Inc., Red Wing, MN (US)

(72) Inventor: Scott C. Casebolt, St. Paul Park, MN (US)

(73) Assignee: D B Industries, LLC, Red Wing, MN (US)

( * ) Notice: Subject to any disclaimer, the term of this patent is extended or adjusted under 35 U.S.C. 154(b) by 226 days.

(21) Appl. No.: 13/660,532

(22) Filed: Oct. 25, 2012

(65) Prior Publication Data
US 2013/0104351 A1 May 2, 2013

Related U.S. Application Data

(60) Provisional application No. 61/552,551, filed on Oct. 28, 2011.

(51) Int. Cl.
*F16B 45/04* (2006.01)
*F16B 21/16* (2006.01)
*A62B 35/00* (2006.01)

(52) U.S. Cl.
CPC ............. *A62B 35/0037* (2013.01); *F16B 45/04* (2013.01)
USPC .................... 24/573.11; 294/82.1; 294/82.23; 294/82.35; 403/324

(58) Field of Classification Search
USPC ............. 24/573.11, 600.4; 294/82.34, 82.35, 294/82.11, 82.1, 82.23; 403/324
See application file for complete search history.

(56) References Cited

U.S. PATENT DOCUMENTS

| | | | |
|---|---|---|---|
| 128,087 A * | 6/1872 | Wright ............................ 278/96 |
| 923,767 A * | 6/1909 | Buckius .......................... 278/96 |
| 3,240,519 A * | 3/1966 | Weasler ........................ 403/325 |
| 4,645,368 A * | 2/1987 | Simpson et al. ................... 403/9 |
| 6,073,724 A | 6/2000 | Wolner et al. |
| 8,104,988 B2 * | 1/2012 | Lunn et al. ..................... 403/154 |
| 8,276,712 B2 | 10/2012 | Smith et al. |
| 2007/0151805 A1 | 7/2007 | Betcher et al. |
| 2009/0211849 A1 | 8/2009 | Smith et al. |
| 2009/0269133 A1 * | 10/2009 | Van Amelsfoort et al. .......................... 403/408.1 |
| 2013/0025968 A1 | 1/2013 | Smith et al. |
| 2013/0104374 A1 | 5/2013 | Schlangen et al. |

FOREIGN PATENT DOCUMENTS

| EP | 2243972 A1 | 10/2010 |
| WO | 00/24304 A1 | 5/2000 |
| WO | 2009/108648 A2 | 9/2009 |

OTHER PUBLICATIONS

International Search Report from PCT/US2012/062107, mailed Aug. 5, 2013 (4 pages).
Reliance Connector 400765, "SkylockTM SRL's—Proven Performance, Built to Last", 1 page (Known of prior to filing present application).

(Continued)

*Primary Examiner* — Jack W Lavinder
(74) *Attorney, Agent, or Firm* — IPLM Group, P.A.

(57) ABSTRACT

A connector comprises a base, a gate, and a locking mechanism. The base forms an opening. The gate is slidably operatively connected to the base and spans the opening. The locking member has an engaging position and a releasing position. The engaging position secures the gate to the base, and the releasing position allows the gate to be moved relative to the base.

27 Claims, 14 Drawing Sheets

(56) References Cited

OTHER PUBLICATIONS

Reliance Connector 4007-65, Reliance Industries—Product Details, 1 page (Printed Jan. 1, 2013. Known of prior to filing present application).

Reliance Fall Protection—Instructions for Use, 4XXX Series SkylocTM Self Retracting Lifelines, 28 pages, Copyright 2011 Reliance Fall Protection, 4006-62 Rev B, Reliance Fall Protection, Reliance Industries, Deer Park, Texas.

Photographs of Connector 4007-65 product (2 photos) (Product known of prior to filing of present application).

Reliance 4007-65 Connector, "StopLite Self Retracting" Product Data Sheet, Rev. A 7.11, 1 page (Known of prior to filing present application.).

\* cited by examiner

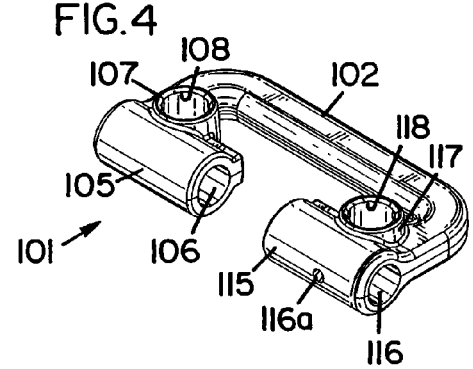
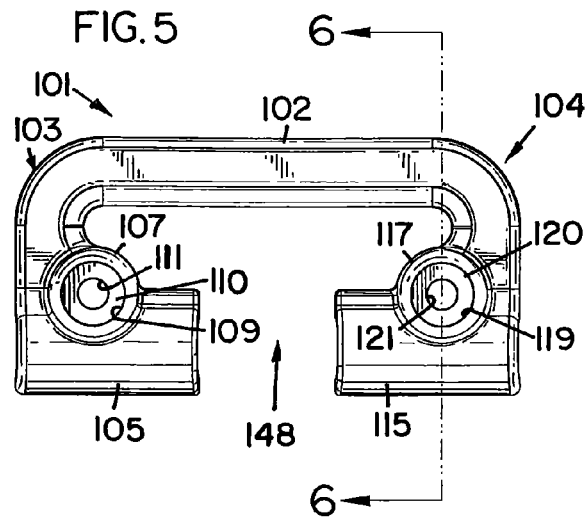
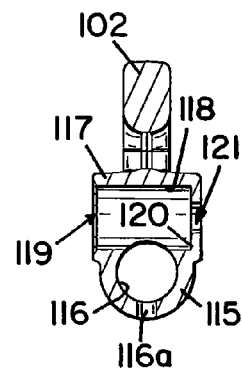
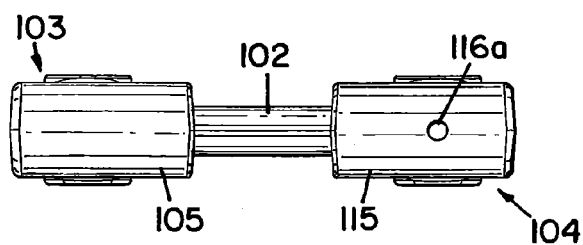

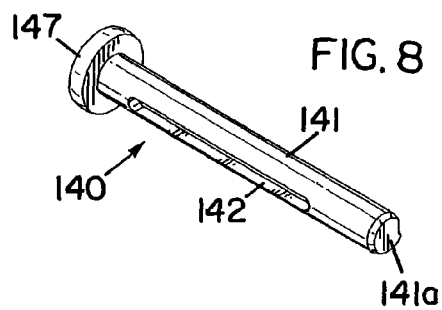
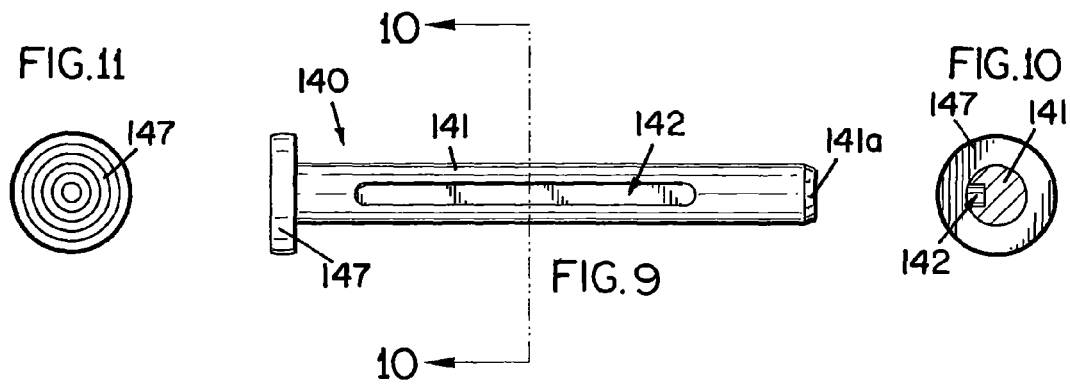
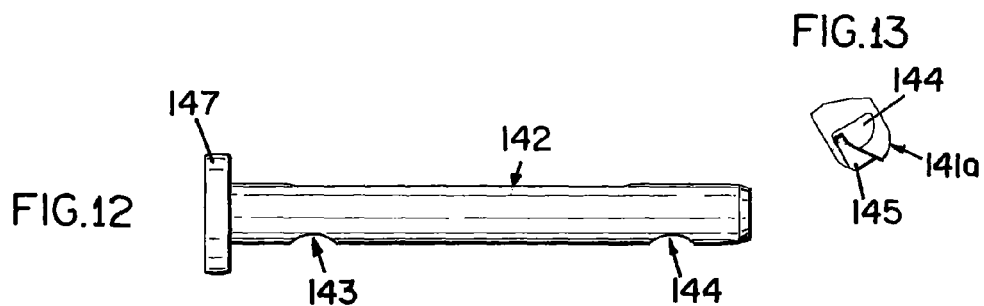
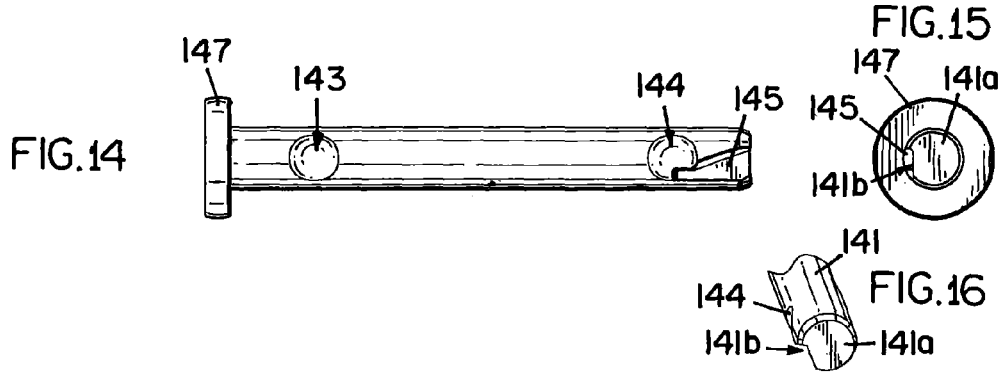

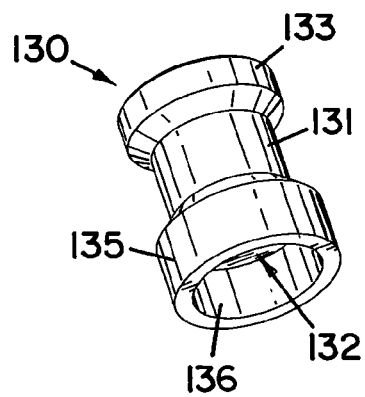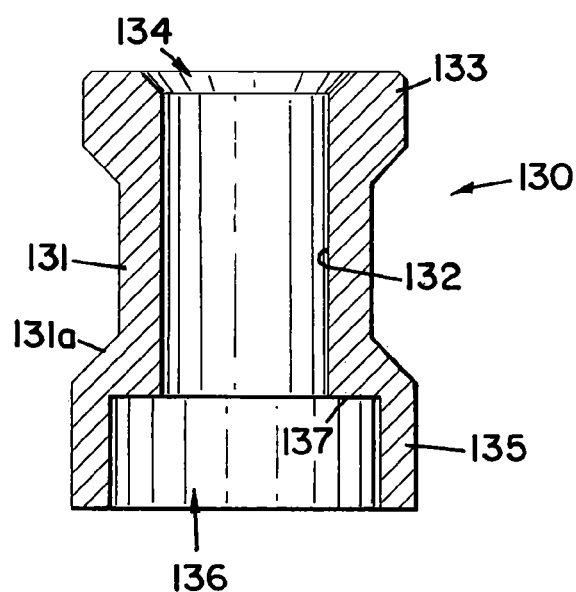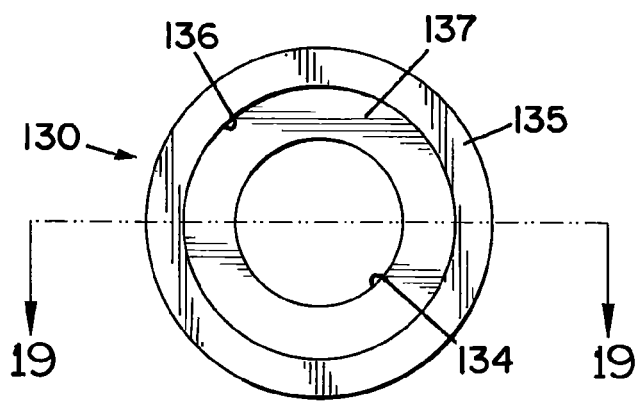

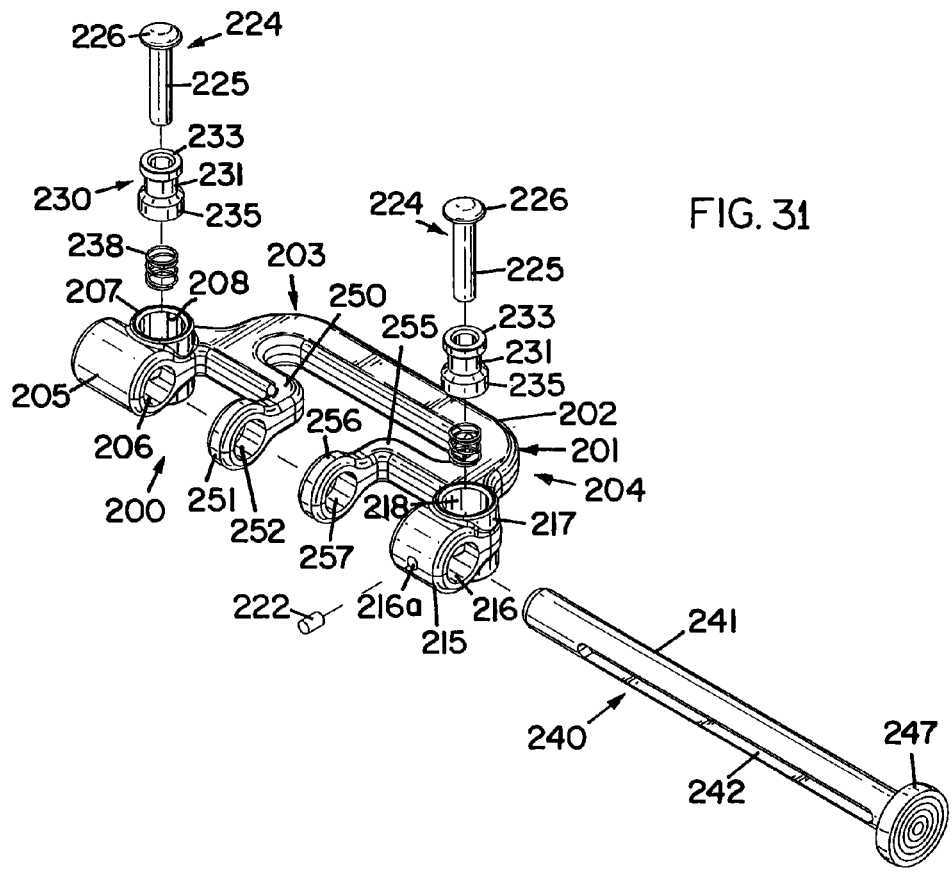
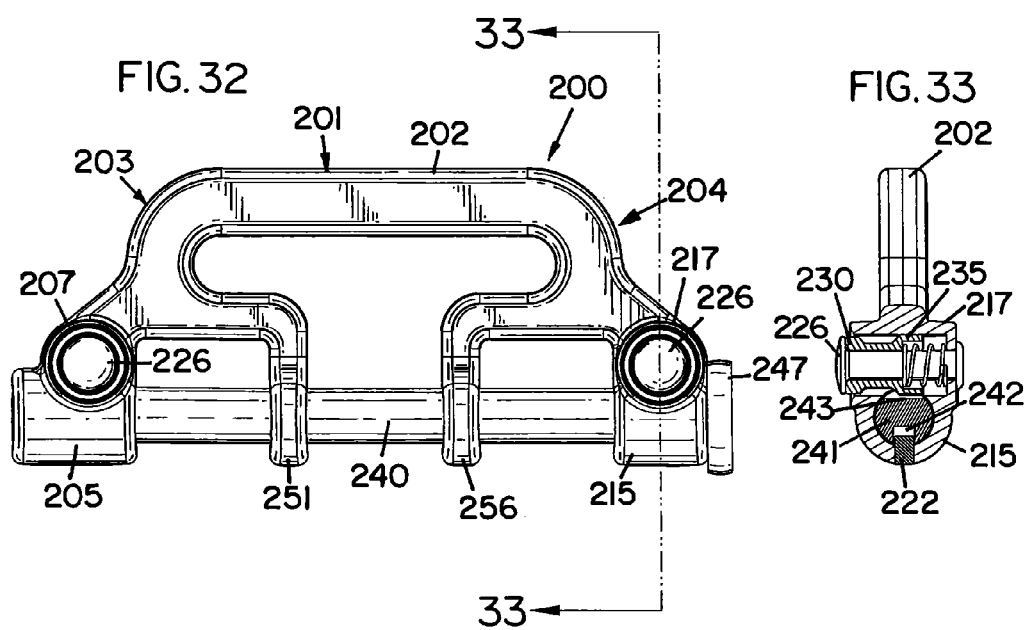

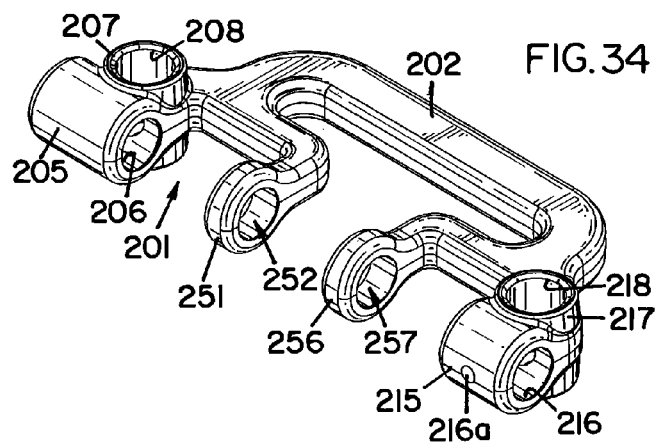
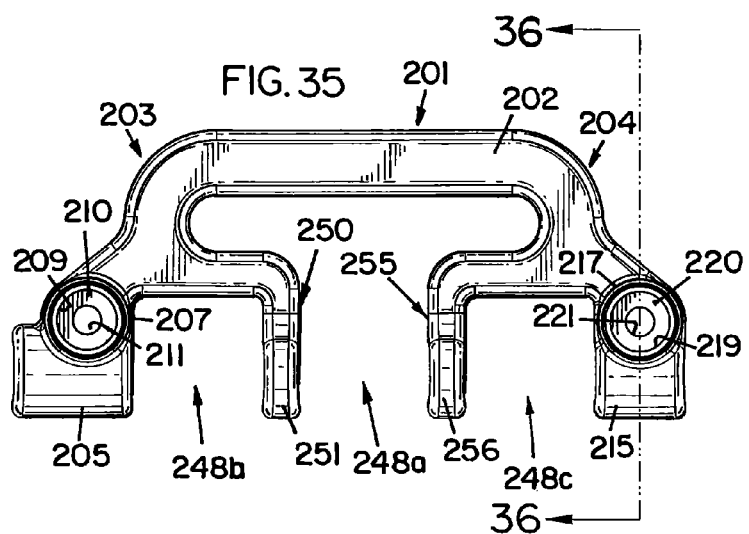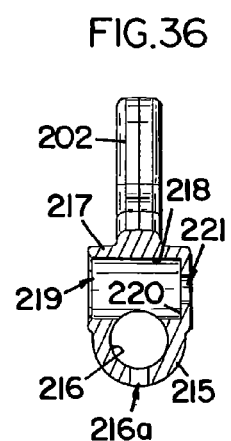
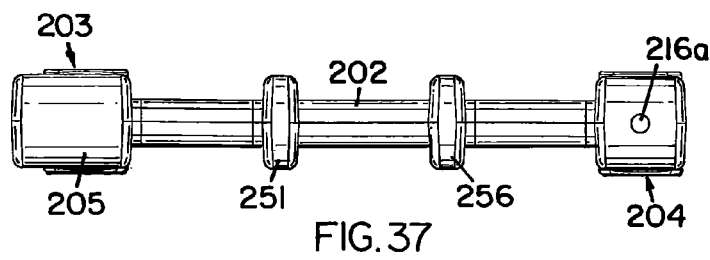

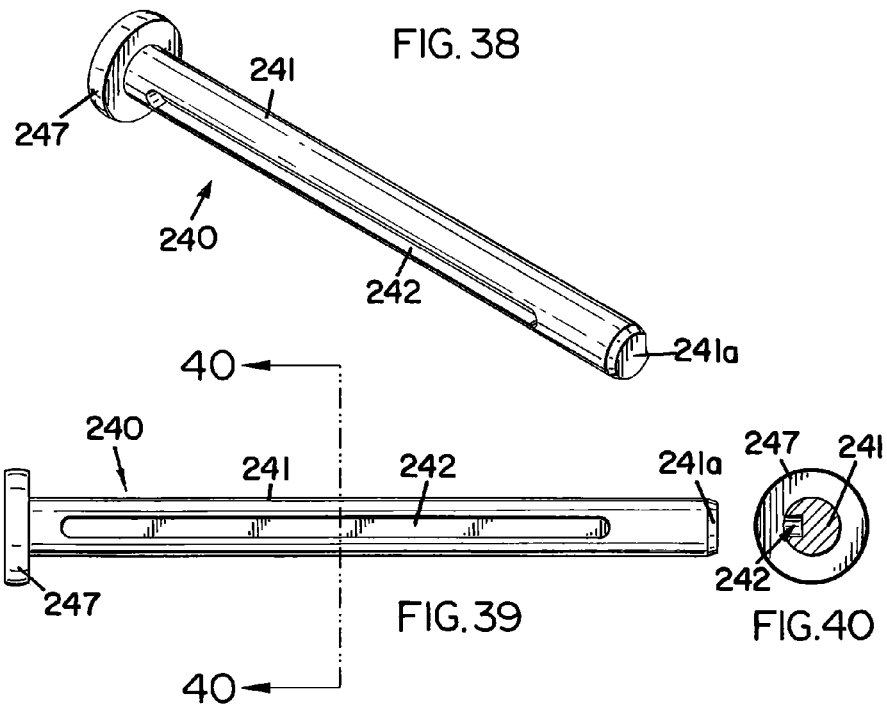
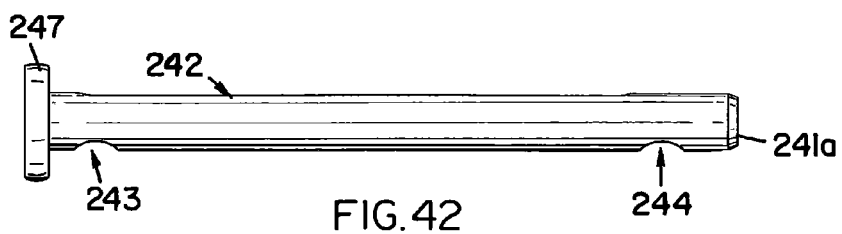
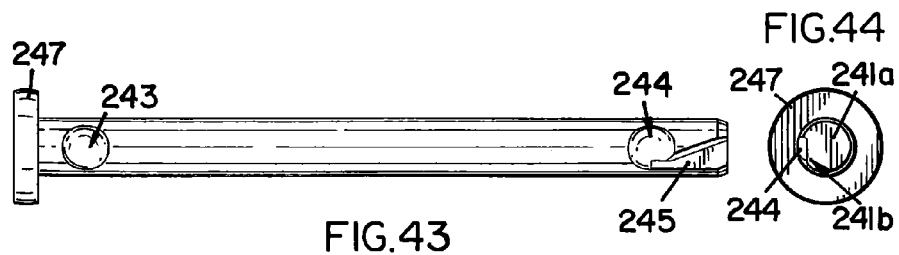
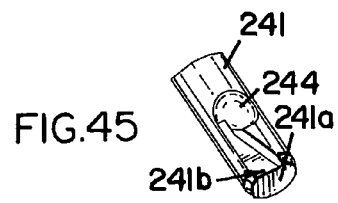

CONNECTOR

CROSS-REFERENCE TO RELATED APPLICATION

This application claims the benefit of U.S. Provisional Application 61/552,551 filed Oct. 28, 2011, which is hereby incorporated by reference.

BACKGROUND OF THE INVENTION

Various occupations place people in precarious positions at relatively dangerous heights thereby creating a need for fall-arresting or fall protection safety apparatus. Among other things, such apparatus usually include a safety line interconnected between a support structure and a person working in proximity to the support structure. The safety line is typically secured to a full-body safety harness worn by the worker. A connector may be used to interconnect the safety line and the full-body safety harness. Obviously, it is important that the connector be reliable and able to withstand the forces of a fall. In addition, it is preferred that the connector be user friendly.

For the reasons stated above and for other reasons stated below, which will become apparent to those skilled in the art upon reading and understanding the present specification, there is a need in the art for a connector that is reliable and user friendly.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, a connector comprises a base, a gate, and a locking mechanism. The base forms an opening. The gate is slidably operatively connected to the base and spans the opening. The locking member has an engaging position and a releasing position. The engaging position secures the gate to the base, and the releasing position allows the gate to be moved relative to the base.

In one embodiment, a connector comprises a base and a gate. The base includes a first end and a second end forming an opening. The first end includes a first receiving portion, a first locking portion, and a first locking mechanism. The first receiving portion includes a first receiving portion bore. The first locking portion is operatively connected to the first receiving portion and includes a first locking portion bore in fluid communication with the first receiving portion bore. The first locking mechanism is positioned within the first locking portion bore and has an engaging position and a releasing position. The first locking mechanism extends at least partially into the first receiving portion bore in the engaging position. The gate is slidably operatively connected to the second end and has a closed position and an open position. The gate spans the opening and a portion of the gate extends through the first receiving portion bore in the closed position. The gate includes a first engaging portion proximate the first receiving portion bore in the closed position. The first locking mechanism extends at least partially into the first engaging portion when the gate is in the closed position and the first locking mechanism is in the first engaging position to secure the gate to the base. The first locking mechanism is positioned out of the first engaging portion when the first locking mechanism is in the releasing position to allow the gate to be moved relative to the base.

In one embodiment, a connector comprises a base, a gate, and a locking member. The base includes a first end and a second end forming an opening. The gate is slidably operatively connected to the first end and the second end and is configured and arranged to span the opening. The locking member has an engaging position and a releasing position. The engaging position secures the gate to the base. The releasing position allows the gate to be moved relative to the base. The locking member comprises a first locking member and a second locking member. The first locking member is proximate the first end and the second locking member is proximate the second end. Both the first locking mechanism and the second locking mechanism are positioned in the releasing positions to move the gate relative to the base.

In one embodiment, a connector comprises a base and a gate. The base includes a bar portion, a first receiving portion, a first locking portion, a first locking mechanism, a second receiving portion, a second locking portion, and a second locking mechanism. The first receiving portion is operatively connected to a first end of the bar portion and includes a first receiving portion bore. The first locking portion is operatively connected to the first receiving portion and includes a first locking portion bore in fluid communication with the first receiving portion bore. The first locking mechanism is positioned within the first locking portion bore and extends at least partially into the first receiving portion bore. The second receiving portion is operatively connected to a second end of the bar portion and includes a second receiving portion bore. The second locking portion is operatively connected to the second receiving portion and includes a second locking portion bore in fluid communication with the second receiving portion bore. The second locking mechanism is positioned within the second locking portion bore and extends at least partially into the second receiving portion bore. A first opening is formed by the first receiving portion and the second receiving portion. The first receiving portion bore is aligned with the second receiving portion bore. The first and second locking mechanisms each have an engaging position and a releasing position. The gate includes a head and a shaft. The head is operatively connected to one end of the shaft, and the shaft includes a distal end opposite the head. The shaft also includes a first engaging portion proximate the distal end and a second engaging portion proximate the head. The first and second receiving portion bores are configured and arranged to receive the shaft, the first locking mechanism is configured and arranged to engage the first engaging portion in the engaging position and the second locking mechanism is configured and arranged to engage the second engaging portion in the engaging position, and both the first and second locking mechanisms are positioned in the releasing positions to move the gate relative to the base.

BRIEF DESCRIPTION OF THE DRAWINGS

The present invention can be more easily understood, and further advantages and uses thereof can be more readily apparent, when considered in view of the detailed description and the following Figures in which:

FIG. 4 is a front perspective view of a base of the connector;

FIG. 5 is a front view of the base shown in FIG. 4;

FIG. 6 is a cross-section view of the base taken along the lines 6-6 in FIG. 5;

FIG. 7 is a bottom view of the base shown in FIG. 4;

FIG. 8 is a front perspective view of a gate of the connector;

FIG. 9 is a bottom view of the gate shown in FIG. 8;

FIG. 10 is a cross-section view of the gate taken along the lines 10-10 in FIG. 9;

FIG. 11 is a side view of the gate shown in FIG. 8;

FIG. 12 is a rear view of the gate shown in FIG. 8;

FIG. 13 is an auxiliary view of the gate shown in FIG. 8 from proximate a middle portion to a distal end of the gate;

FIG. 14 is a top view of the gate shown in FIG. 8;

FIG. 15 is a side view of the gate shown in FIG. 8;

FIG. 16 is an auxiliary view of a portion of the gate shown in FIG. 8;

FIG. 17 is a front perspective view of an engaging member of the connector;

FIG. 18 is a bottom view of the engaging member shown in FIG. 17;

FIG. 19 is a cross-section view of the engaging member taken along the lines 19-19 in FIG. 18;

FIG. 31 is an exploded front perspective view of another embodiment connector constructed in accordance with the principles of the present invention;

FIG. 32 is a front view of the connector shown in FIG. 31;

FIG. 33 is a cross-section view of the connector taken along the lines 33-33 in FIG. 32;

FIG. 34 is a front perspective view of a base of the connector;

FIG. 35 is a front view of the base shown in FIG. 34;

FIG. 36 is a cross-section view of the base taken along the lines 36-36 in FIG. 35;

FIG. 37 is a bottom view of the base shown in FIG. 34;

FIG. 38 is a front perspective view of a gate of the connector;

FIG. 39 is a bottom view of the gate shown in FIG. 38;

FIG. 40 is a cross-section view of the gate taken along the lines 40-40 in FIG. 39;

FIG. 41 is a side view of the gate shown in FIG. 38;

FIG. 42 is a rear view of the gate shown in FIG. 38;

FIG. 43 is a top view of the gate shown in FIG. 38;

FIG. 44 is a side view of the gate shown in FIG. 38;

FIG. 45 is an auxiliary view of a portion of the gate shown in FIG. 38;

In accordance with common practice, the various described features are not drawn to scale but are drawn to emphasize specific features relevant to the present invention. Reference characters denote like elements throughout the Figures and the text.

DETAILED DESCRIPTION OF THE INVENTION

Figure 1:
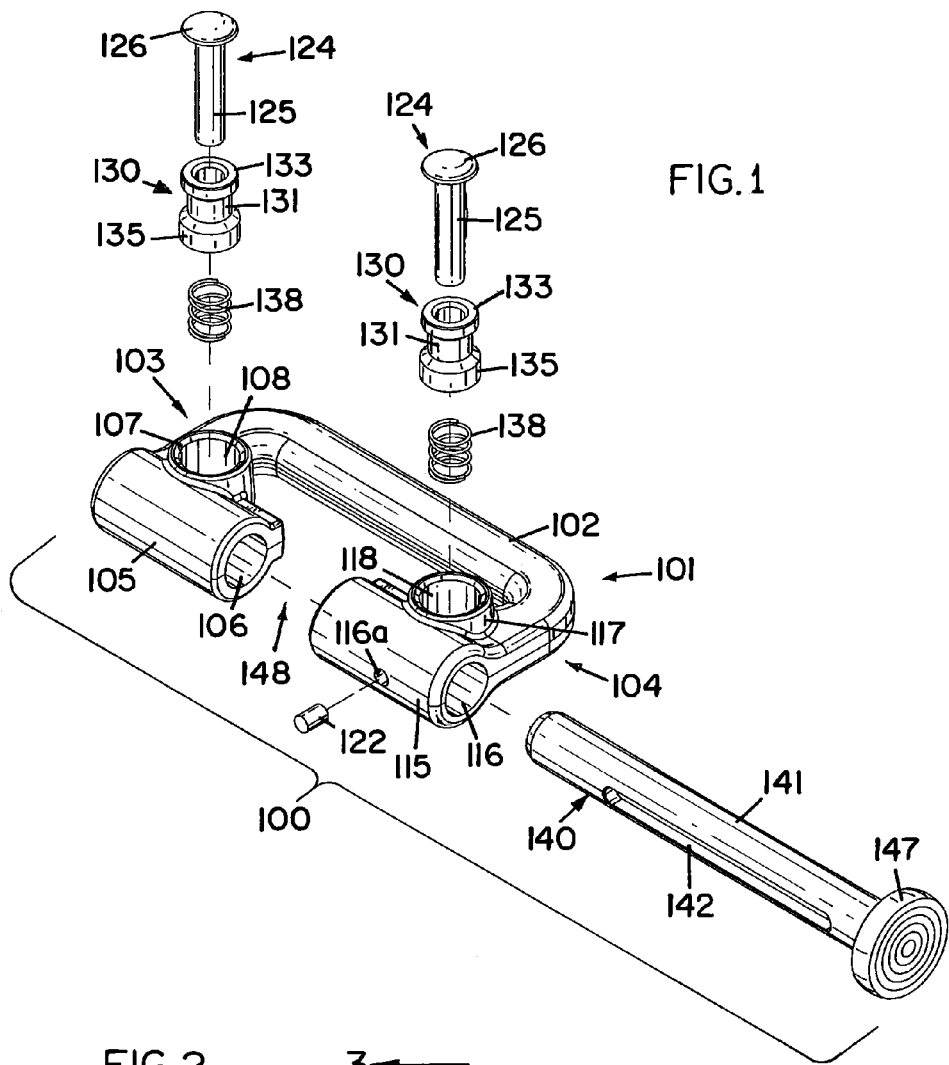
FIG. 1 is an exploded front perspective view of a connector constructed in accordance with the principles of the present invention.

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Embodiments of the present invention provide a connector that is user friendly and secure. For example, the connector could be used to interconnect a safety harness and a self-retracting lifeline.

For ease of reference, the embodiments are being described in the orientations in which they are shown. Other orientations are possible, and this description should not limit the orientations in which the connectors are used.

One embodiment connector 100 is shown in FIGS. 1-3 and 29-30. The connector 100 includes a base 101, receiving portions 105 and 115, locking portions 107 and 117, and a gate 140. The base 101 is generally C-shaped and includes an elongate or bar portion 102 with a first end 103, to which a first receiving portion 105 and a first locking portion 107 are operatively connected, and a second end 104, to which a second receiving portion 115 and a second locking portion 117 are operatively connected. The first and second ends 103 and 104 include corners and extension portions that extend downward approximately ninety degrees from the bar portion 102.

The first receiving portion 105 is generally cylindrical with a bore 106 extending parallel to the bar portion 102. One end of the first receiving member 105 is operatively connected to the first end 103 and the remaining portion of the first receiving member 105 extends inward. The first locking portion 107 is positioned proximate the corner where the first end 103 and the first receiving portion 105 are operatively connected. The first locking portion 107 is also generally cylindrical with a bore 108, which is perpendicular to the bore 106, and the bores 106 and 108 intersect so that they are in fluid communication with one another. The first locking portion 107 includes a larger opening 109 proximate the front and a bottom 110 with a smaller opening 111 proximate the rear as shown in FIGS. 5 and 6.

The second receiving portion 115 is generally cylindrical with a bore 116 extending parallel to the bar portion 102. One end of the second receiving member 115 is operatively connected to the second end 104 and the remaining portion of the second receiving member 115 extends inward. The second locking portion 117 is positioned proximate the corner where the second end 104 and the second receiving portion 115 are operatively connected. The second locking portion 117 is also generally cylindrical with a bore 118, which is perpendicular to the bore 116, and the bores 116 and 118 intersect so that they are in fluid communication with one another. The second locking portion 117 includes a larger opening 119 proximate the front and a bottom 120 with a smaller opening 121 proximate the rear as shown in FIGS. 5 and 6. The second receiving portion 115 also includes a lateral bore 116a on its bottom, which is opposite the second locking portion 117. The lateral bore 116a aligns with the juncture of the bores 116 and 118 and is configured and arranged to receive a retaining pin 122. The receiving portions 105 and 115 form an opening 148 therebetween.

Each of the first locking portion 107 and the second locking portion 117 is configured and arranged to receive a biasing member 138, an engaging member 130, and a rivet 124. These components form a locking mechanism. The rivet 124 includes a head 126 operatively connected to one end of a shaft 125, which has a distal end 125a opposite the head 126. The engaging member 130 includes a cylindrical base portion 131 to which a first flanged portion 133 is operatively connected proximate one end and a second flanged portion 135 is operatively connected proximate the other end. A bore 132 extends through the engaging member 130, and an opening 134 in the first flanged portion 133 and an opening 136 in the second flanged portion 135 provide access to the bore 132. The opening 136 in the second flanged portion 135 is larger than the bore 132 to form a ledge portion 137 inside the engaging member 130 proximate the juncture of the base portion 131 and the second flanged portion 135. This is shown in FIGS. 18 and 19. The biasing member 138 is configured and arranged to fit within the opening 136 of the second flanged portion 135 and one end of the biasing member 138 contacts the ledge portion 137. Along with the engaging member 130, the biasing member 138 is also configured and arranged to fit within the bore 108 or 118 of the locking portion 107 or 108 so that the other end of the biasing member 138 contacts the bottom 110 or 120.

Figure 3A:
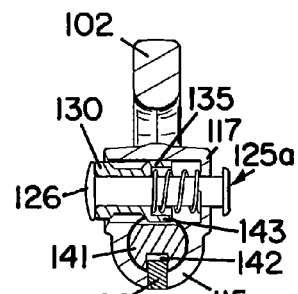
FIG. 3A is a cross-section view of the connector taken along the lines 3-3 in FIG. 2 in an engaging position.
Figure 3B:
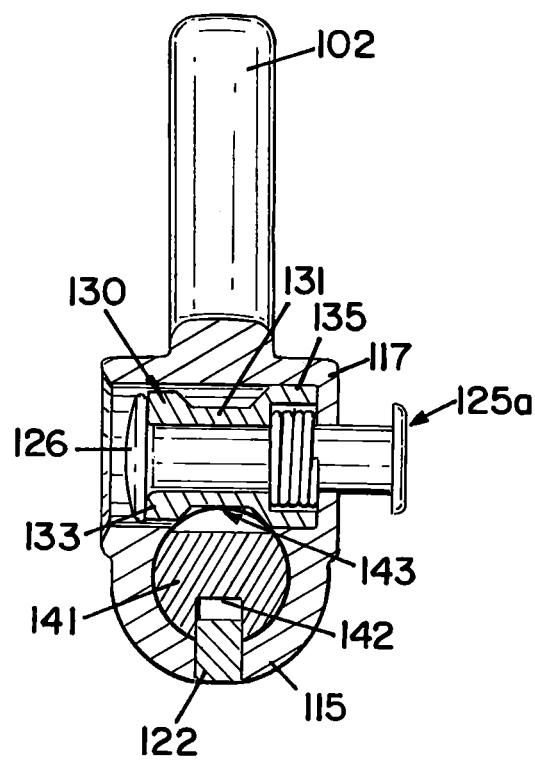
FIG. 3B is a cross-section view of the connector shown in FIG. 3A in a releasing position.
Figure 20:
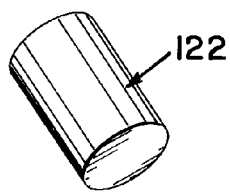
FIG. 20 is a front perspective view of a retaining pin of the connector.
Figure 22:
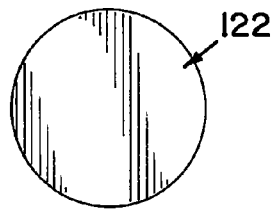
FIG. 22 is a bottom view of the retaining pin shown in FIG. 20.
Figure 21:
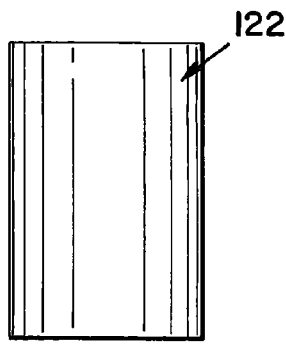
FIG. 21 is a front view of the retaining pin shown in FIG. 20.
Figure 23:
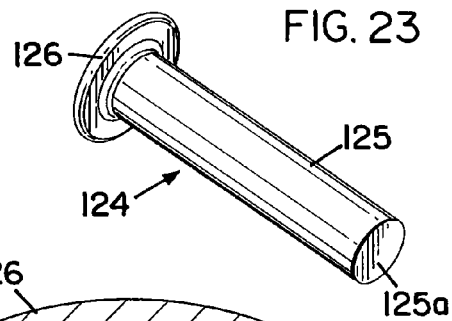
FIG. 23 is a front perspective view of a rivet of the connector.
Figure 25:
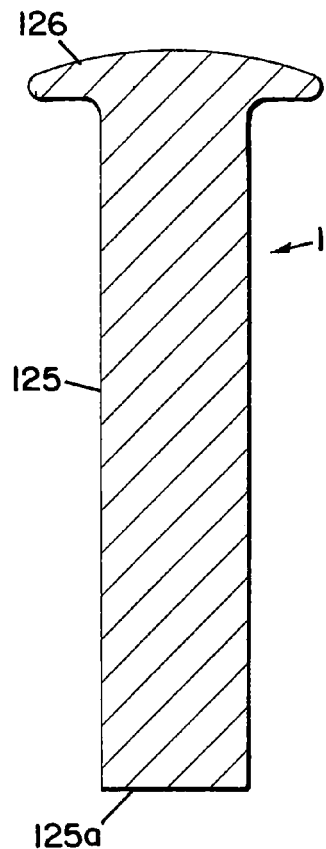
FIG. 25 is a cross-section view of the rivet taken along the lines 25-25 in FIG. 24.
Figure 24:
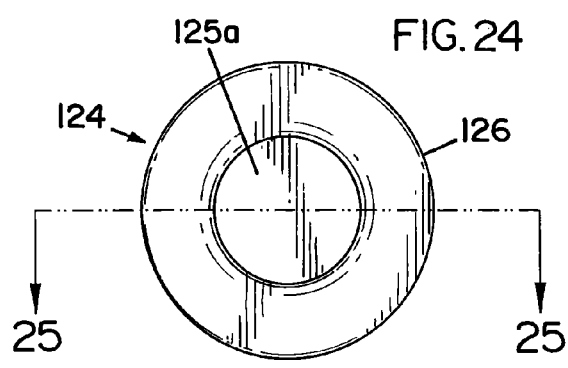
FIG. 24 is a bottom view of the rivet shown in FIG. 23.
Figure 26:
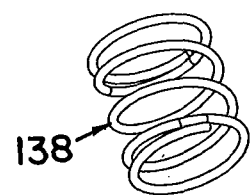
FIG. 26 is a front perspective view of a biasing member of the connector.
Figure 27:
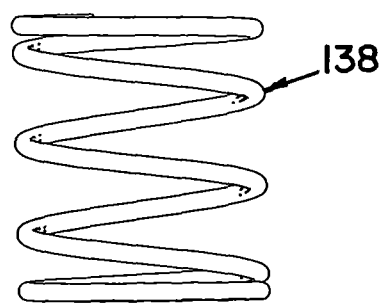
FIG. 27 is a bottom view of the biasing member shown in FIG. 26.
Figure 28:
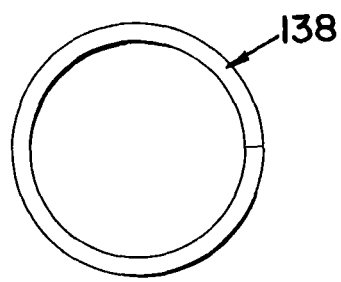
FIG. 28 is a front view of the biasing member shown in FIG. 26.

The rivet 124 extends through the bore 132 of the engaging member 130, the bore of the biasing member 138, and the bore 108 or 118 of the locking portion 107 or 117 and then the distal end 125a is deformed, as shown in FIG. 3, by means well known in the art to secure the rivet 124 to the locking portion 107 or 117. The rivet 124 captures the engaging member 130 and the biasing member 138 within with bore 108 or 118 between the head 126 and the deformed distal end 125a. The ends of the biasing member 138 contact the ledge portion 137 and the bottom 110 or 120 and place a biasing force on the engaging member 130 to bias the engaging member 130 to an engaging position, which is shown in FIG. 3A. An opposing force can be placed on the head 126 of the rivet 124 to compress the biasing member 138 and move the engaging member 130 from the engaging position to a releasing position, which is shown in FIG. 3B.

The gate 140 includes a head 147 operatively connected to one end of a shaft 141, which has a distal end 141a opposite the head 147. The bottom side of the shaft 141 includes a slot 142 that extends along an intermediate portion of the shaft 141. The top side of the shaft 141 includes a first notch 143 proximate the head 147 and a second notch 144 proximate the distal end 141a. A ramp portion 145 extends from the second notch 144 to the distal end 141a, and the distal end 141a includes a notched portion 141b to provide access to the ramp portion 145.

Before the retaining pin 122 is positioned within the lateral bore 116a, at least the locking mechanism proximate the second receiving portion 115 is moved into its releasing position and the distal end 141a of the gate 140 is inserted into the bore 116 until at least the slot 142 of the gate 140 is aligned with the bore 116a. Then the retaining pin 122 is friction fit within the lateral bore 116a and extends into the bore 116 to fit within the slot 142 as show in FIG. 3. The retaining pin 122 acts as a stop member to prevent the gate 140 from sliding all the way out of the second receiving portion 115. Because the retaining pin 122 fits within the slot 142, when the retaining pin 122 contacts the gate 140 proximate the end of the slot 142 proximate the distal end 141a, the gate 140 cannot be slid further out of the second receiving portion 115.

Figure 2:
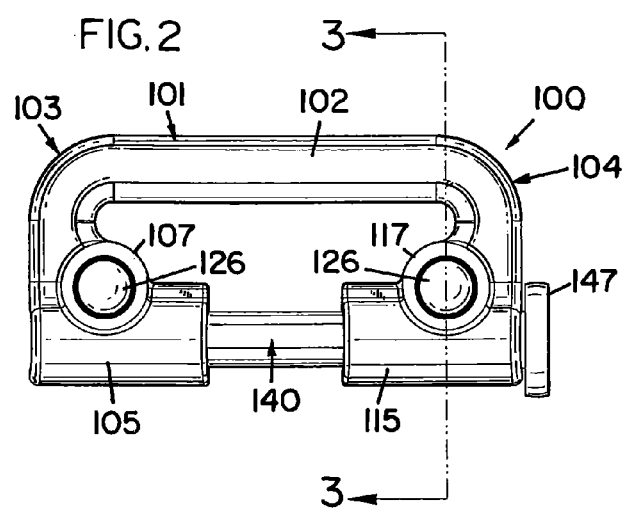
FIG. 2 is a front view of the connector shown in FIG. 1.

When assembled, as shown in FIGS. 2 and 3, the gate 140 is positioned within the bores 106 and 116 of the base's first and second receiving portions 105 and 115. The retaining pin 122 is positioned within the slot 142, and the second flanged portions 135 of the engaging members 130 are positioned within the notches 143 and 144 of the gate 140. The gate 140 includes a slot 142 in which the retaining pin 122 is positioned to not only act as a stop member, as discussed above, but to keep the gate 140 in the desired orientation so that the notches 143 and 144 can be engaged by the locking mechanisms. Thus, the notches 143 and 144 are engaging portions configured and arranged to be engaged by the locking mechanisms. Each locking mechanism includes the locking portion 107 or 117, the biasing member 138, the engaging member 130, and the rivet 124.

In operation, to release the gate 140, the heads 126 of both rivets 124 are pressed downward into the respective locking portions 107 and 117 so that the biasing members 138 are compressed and the engaging members 130 move downward. Each locking mechanism operates independently of the other. Therefore, both locking mechanisms need to be in the releasing position to allow the gate to be opened. As the engaging members 130 move downward, the second flanged portions 135 move out of the notches 143 and 144 and the cylindrical base portions 131 are positioned proximate the notches 143 and 144 as shown in FIG. 3B. When the cylindrical base portions 131 are positioned proximate the notches 143 and 144, the gate 140 is no longer engaged by the locking mechanisms and there is enough clearance to slide the gate 140 completely out of the first receiving portion 105. Because of the retaining pin 122, the gate 140 cannot be completely slid out of the second receiving portion 115.

When the gate 140 is slid out of the first receiving portion 105, the locking mechanism returns to the engaging position due to the biasing force exerted on the engaging member 130 by the biasing member 138. Because the gate 140 remains in the second receiving portion 115 and the notch 144 is not proximate the locking mechanism, the locking mechanism remains in the releasing position.

Figure 29:
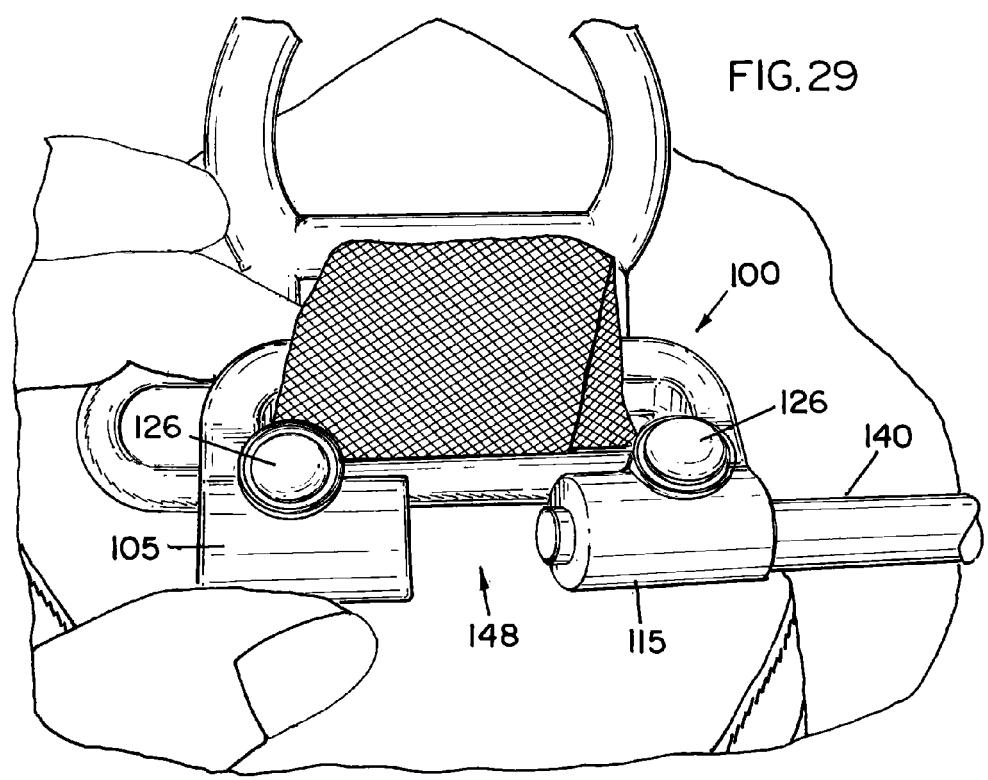
FIG. 29 is a front view of the connector shown in FIG. 1 operatively connected to a safety harness.
Figure 30:
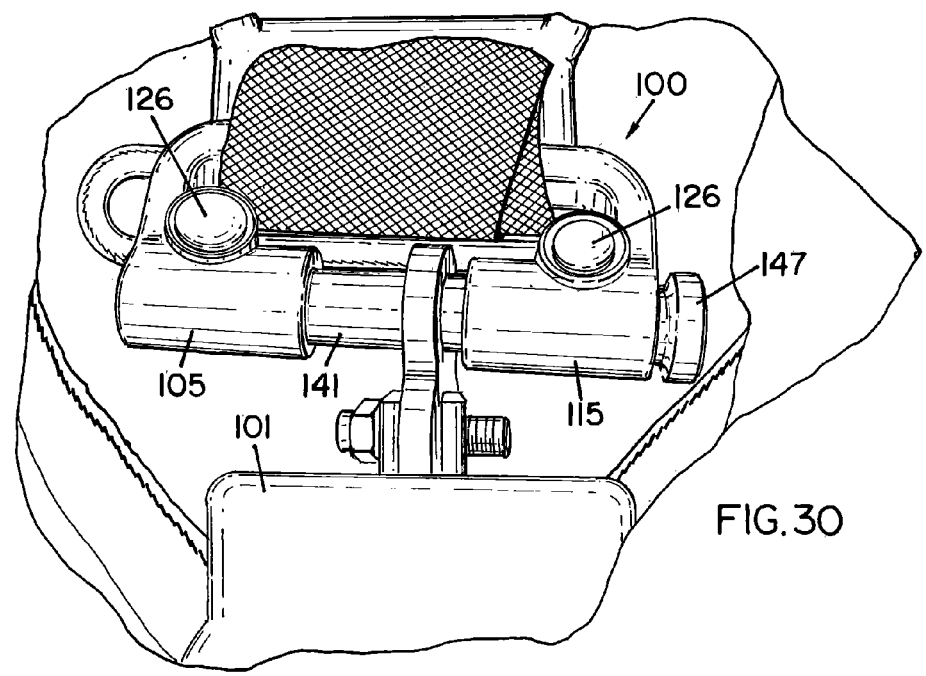
FIG. 30 is a front view of the connector shown in FIG. 1 operatively connected to a safety harness and to a self-retracting lifeline.
Figure 46:
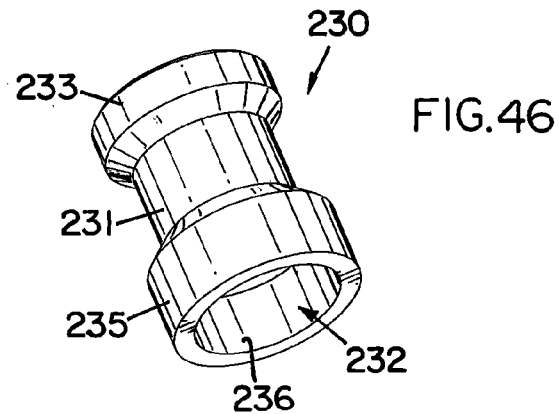
FIG. 46 is a front perspective view of an engaging member of the connector.

When the gate 140 is moved from a closed position to an open position, the opening 148 between the receiving portions 105 and 115 is accessible and, as shown in FIGS. 29 and 30, the connector 100 may be connected to straps of a safety harness. After the straps have been positioned within the opening 148, the gate 140 is moved from the open position to the closed position to capture the straps between the bar portion 102 and the gate 140. A safety device, such as a self-retracting lifeline, may be connected to the gate 140 before the gate 140 is slid into the first receiving portion 105 by positioning an aperture of the self-retracting lifeline's connector portion between the receiving portions 105 and 115 and then sliding the gate 140 through the connector portion's aperture. To move the gate 140 from the open position into the closed position, the gate 140 is simply slid back into the receiving portions 105 and 115. When the distal end 141a of the gate 140 is slid into the first receiving portion 105, the notched portion 141b and the ramp portion 145 allow the end of the gate 140 proximate the distal end 141a to be slid past the engaging member 130. The ramp portion 145 of the gate 140 contacts the angled surface 131a, which interconnects the base portion 131 and the second flanged portion 135 of the engaging member 130, and pushes the engaging member 130 so that the biasing member 138 compresses and the base portion 131 is proximate the notch 143. When the notches 143 and 144 are positioned proximate the respective locking mechanisms, the locking mechanisms return to the engaging positions due to the biasing forces exerted on the engaging members 130 by the biasing members 138 and the gate 140 cannot be slid outward until both of the locking mechanisms are in the releasing positions.

Another embodiment connector 200 is shown in FIGS. 31-33. The connector 200 includes a base 201, receiving portions 205 and 215, extension portions 250 and 255, locking portions 207 and 217, and a gate 240. The base 201 is generally C-shaped and includes an elongate or bar portion 202 with a first end 203 and a second end 204. The first and second ends 203 and 204 include corners and extension portions that extend downward approximately ninety degrees from the bar portion 202. A first receiving portion 205, a first extension portion 250, and a first locking portion 207 are operatively connected to the first end 203, and a second receiving portion 215, a second extension portion 255, and a second locking portion 217 are operatively connected to the second end 204.

Two prongs, an outer prong and an inner prong, extend outward from the first end 203. Operatively connected to the outer prong is the first receiving portion 205, which is generally cylindrical with a bore 206 extending parallel to the bar portion 202. Operatively connected to the inner prong is the first extension portion 250, which includes a ring portion 251 with an aperture 252 in alignment with the bore 206 of the first receiving portion 205. The first locking portion 207 is positioned proximate the juncture of the outer prong and the first receiving portion 205. The first locking portion 207 is also generally cylindrical with a bore 208, which is perpendicular to the bore 206, and the bores 206 and 208 intersect so that they are in fluid communication with one another. The first locking portion 207 includes a larger opening 209 proximate the front and a bottom 210 with a smaller opening 211 proximate the rear as shown in FIGS. 35 and 36.

Two prongs, an outer prong and an inner prong, extend outward from the second end 204. Operatively connected to the outer prong is the second receiving portion 215, which is generally cylindrical with a bore 216 extending parallel to the bar portion 202. Operatively connected to the inner prong is the second extension portion 255, which includes a ring portion 256 with an aperture 257 in alignment with the bore 216 of the second receiving portion 215. The second locking portion 217 is positioned proximate the juncture of the outer prong and the second receiving portion 215. The second locking portion 217 is also generally cylindrical with a bore 218, which is perpendicular to the bore 216, and the bores 216 and 218 intersect so that they are in fluid communication with one another. The second locking portion 217 includes a larger opening 219 proximate the front and a bottom 220 with a smaller opening 221 proximate the rear as shown in FIGS. 35 and 36. The second receiving portion 215 also includes a lateral bore 216a on its bottom, which is opposite the second locking portion 217. The lateral bore 216a aligns with the juncture of the bores 216 and 218 and is configured and arranged to receive a retaining pin 222. The extension portions 250 and 255 form an opening 248a therebetween, the first receiving portion 205 and the first extension portion 250 form an opening 248b therebetween, and the second receiving portion 215 and the second extension portion 255 form an opening 248c therebetween.

Figure 48:
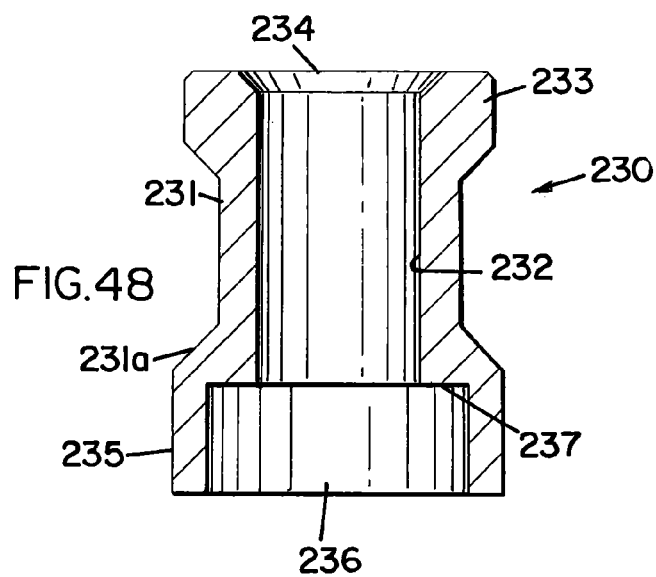
FIG. 48 is a cross-section view of the engaging member taken along the lines 48-48 in FIG. 47.
Figure 47:
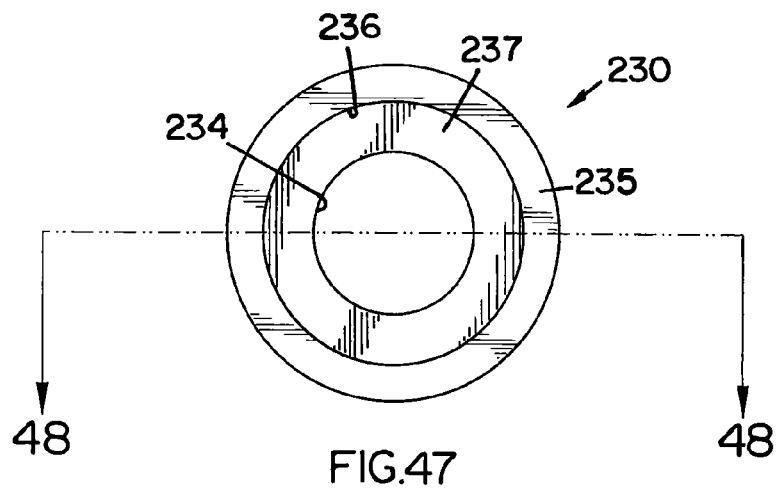
FIG. 47 is a bottom view of the engaging member shown in FIG. 46.
Figure 49:
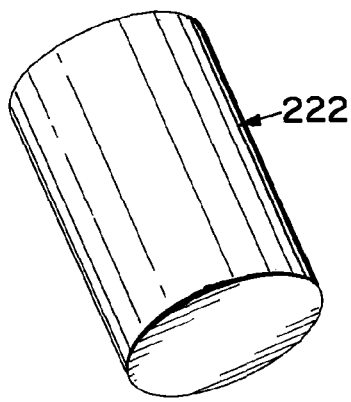
FIG. 49 is a front perspective view of a retaining pin of the connector.
Figure 52:
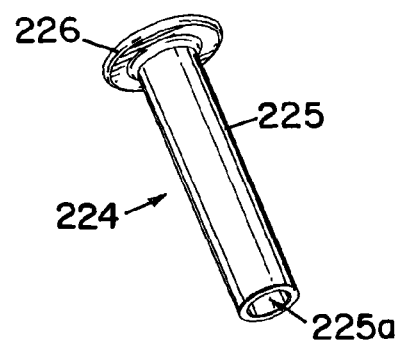
FIG. 52 is a bottom perspective view of a rivet of the connector.
Figure 50:
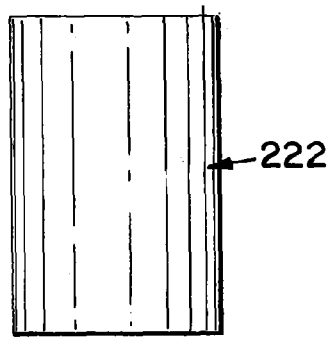
FIG. 50 is a front view of the retaining pin shown in FIG. 49.
Figure 53:
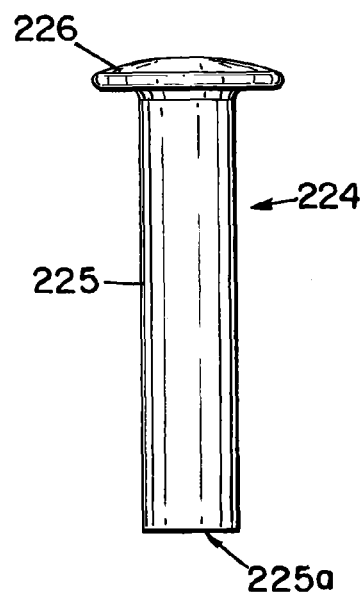
FIG. 53 is a bottom view of the rivet shown in FIG. 52.
Figure 51:
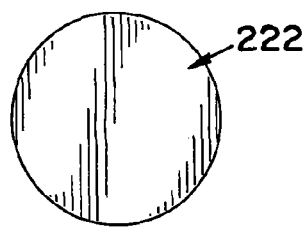
FIG. 51 is a bottom view of the retaining pin shown in FIG. 49.
Figure 54:
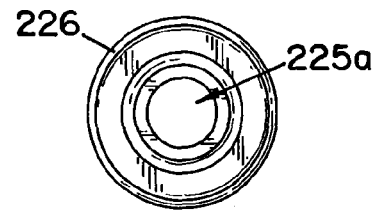
FIG. 54 is a rear view of the rivet shown in FIG. 52.
Figure 55:
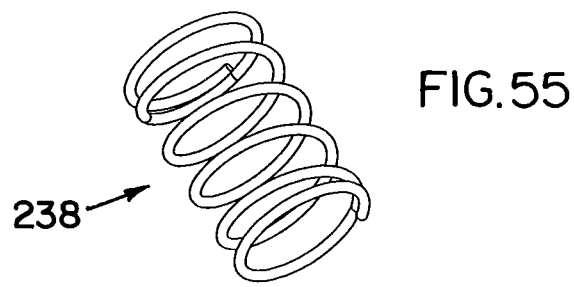
FIG. 55 is a bottom perspective view of a biasing member of the connector.
Figure 56:
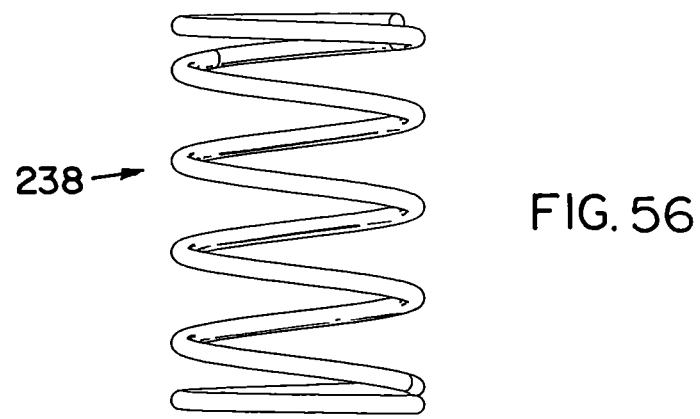
FIG. 56 is a bottom view of the biasing member shown in FIG. 55.
Figure 57:
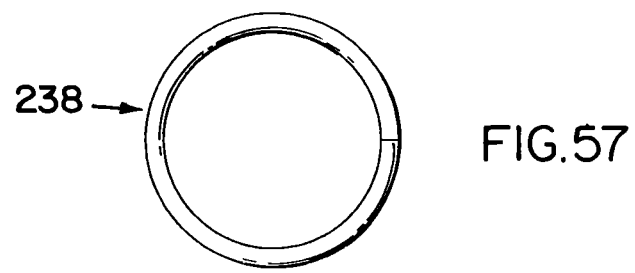
FIG. 57 is a rear view of the biasing member shown in FIG. 55.

Each of the first locking portion 207 and the second locking portion 217 is configured and arranged to receive a biasing member 238, an engaging member 230, and a rivet 224. These components form a locking mechanism. The rivet 224 includes a head 226 operatively connected to one end of a shaft 225, which has a distal end 225a opposite the head 226. The engaging member 230 includes a cylindrical base portion 231 to which a first flanged portion 233 is operatively connected proximate one end and a second flanged portion 235 is operatively connected proximate the other end. A bore 232 extends through the engaging member 230, and an opening 234 in the first flanged portion 233 and an opening 236 in the second flanged portion 235 provide access to the bore 232. The opening 236 in the second flanged portion 235 is larger than the bore 232 to form a ledge portion 237 inside the engaging member 230 proximate the juncture of the base portion 231 and the second flanged portion 235. This is shown in FIGS. 47 and 48. The biasing member 238 is configured and arranged to fit within the opening 236 of the second flanged portion 235 and one end of the biasing member 238 contacts the ledge portion 237. Along with the engaging member 230, the biasing member 238 is also configured and arranged to fit within the bore 208 or 218 of the locking portion 207 or 208 so that the other end of the biasing member 238 contacts the bottom 210 or 220.

The rivet 224 extends through the bore 232 of the engaging member 230, the bore of the biasing member 238, and the bore 208 or 218 of the locking portion 207 or 217 and then the distal end 225a is deformed, as shown in FIG. 33, by means well known in the art to secure the rivet 224 to the locking portion 207 or 217. The rivet 224 captures the engaging member 230 and the biasing member 238 within with bore 208 or 218 between the head 226 and the deformed distal end 225a. The ends of the biasing member 238 contact the ledge portion 237 and the bottom 210 or 220 and place a biasing force on the engaging member 230 to bias the engaging member 230 to an engaging position. An opposing force can be placed on the head 226 of the rivet 224 to compress the biasing member 238 and move the engaging member 230 from the engaging position to a releasing position.

The gate 240 includes a head 247 operatively connected to one end of a shaft 241, which has a distal end 241a opposite the head 247. The bottom side of the shaft 241 includes a slot 242 that extends along an intermediate portion of the shaft 241. The top side of the shaft 241 includes a first notch 243 proximate the head 247 and a second notch 244 proximate the distal end 241a. A ramp portion 245 extends from the second notch 244 to the distal end 241a, and the distal end 241a includes a notched portion 241b to provide access to the ramp portion 245.

Before the retaining pin 222 is positioned within the lateral bore 216a, at least the locking mechanism proximate the second receiving portion 215 is moved into its releasing position and the distal end 241a of the gate 240 is inserted into the bore 216 until at least the slot 242 of the gate 240 is aligned with the bore 216a. Then the retaining pin 222 is friction fit within the lateral bore 216a and extends into the bore 216 to fit within the slot 242 as show in FIG. 33. The retaining pin 222 acts as a stop member to prevent the gate 240 from sliding all the way out of the second receiving portion 215. Because the retaining pin 222 fits within the slot 242, when the retaining pin 222 contacts the gate 240 proximate the end of the slot 242 proximate the distal end 241a, the gate 240 cannot be slid further out of the second receiving portion 215.

When assembled, as shown in FIGS. 32 and 33, the gate 240 is positioned within the bores 206 and 216 of the base's first and second receiving portions 205 and 215 and within the apertures 252 and 257 of the base's first and second extension portions 250 and 255. The retaining pin 222 is positioned within the slot 242, and the second flanged portions 235 of the engaging members 230 are positioned within the notches 243 and 244 of the gate 240. The gate 240 includes a slot 242 in which the retaining pin 222 is positioned to not only act as a stop member, as discussed above, but to keep the gate 240 in the desired orientation so that the notches 243 and 244 can be engaged by the locking mechanisms. Thus, the notches 243 and 244 are engaging portions configured and arranged to be engaged by the locking mechanisms. Each locking mechanism includes the locking portion 207 or 217, the biasing member 238, the engaging member 230, and the rivet 224.

In operation, to release the gate 240, the heads 226 of both rivets 224 are pressed downward into the respective locking portions 207 and 217 so that the biasing members 238 are compressed and the engaging members 230 move downward. Each locking mechanism operates independently of the other. Therefore, both locking mechanisms need to be in the releasing position to allow the gate to be opened. As the engaging members 230 move downward, the second flanged portions 235 move out of the notches 243 and 244 and the cylindrical base portions 231 are positioned proximate the notches 243 and 244. When the cylindrical base portions 231 are positioned proximate the notches 243 and 244, the gate 240 is no longer engaged by the locking mechanisms and there is enough clearance to slide the gate 240 completely out of the first receiving portion 205. Because of the retaining pin 222, the gate 240 cannot be completely slid out of the second receiving portion 215.

When the gate 240 is slid out of the first receiving portion 205, the locking mechanism returns to the engaging position due to the biasing force exerted on the engaging member 230 by the biasing member 238. Because the gate 240 remains in the second receiving portion 215 and the notch 244 is not proximate the locking mechanism, the locking mechanism remains in the releasing position.

When the gate 240 is moved from a closed position to an open position, the openings 248a, 248b, and 248c are accessible and the connector 200 may be connected to straps of a safety harness and a safety device such as a self-retracting lifeline. After the straps have been positioned within the opening 248a, the gate 240 is moved from the open position to the closed position to capture the straps between the bar portion 202 and the gate 240. The safety device, such as a self-retracting lifeline, is connected to the gate 240 before the gate 240 is slid into at least the first extension portion 250 and the first receiving portion 205 by positioning an aperture of the self-retracting lifeline's connector portion between the extension portions 250 and 255 and then sliding the gate 240 through the connector portion's aperture. If it is desired to connect two safety devices to the connector 200, a first device is similarly connected between the first receiving portion 205 and the first extension portion 250 and a second device is similarly connected between the second extension portion 255 and the second receiving portion 215. If it is desired to connect three safety devices to the connector 200, a device is similarly connected to the gate 240 proximate each of the openings 248a, 248b, and 248c. To move the gate 240 from the open position into the closed position, the gate 240 is simply slid through the receiving portion 215, the apertures 257 and 252, and back into the receiving portion 205. When the distal end 241a of the gate 240 is slid into the first receiving portion 205, the notched portion 241b and the ramp portion 245 allow the end of the gate 240 proximate the distal end 241 a to be slid past the engaging member 230. The ramp portion 245 of the gate 240 contacts the angled surface 231a, which interconnects the base portion 231 and the second flanged portion 235 of the engaging member 230, and pushes the engaging member 230 so that the biasing member 238 compresses and the base portion 231 is proximate the notch 243. When the notches 243 and 244 are positioned proximate the respective locking mechanisms, the locking mechanisms return to the engaging positions due to the biasing forces exerted on the engaging members 230 by the biasing members 238 and the gate 240 cannot be slid outward until both of the locking mechanisms are in the releasing positions.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof

The invention claimed is:

1. A connector, comprising:
    a base including a first end and a second end forming an opening;
    a first receiving portion;
    a first locking portion;
    a first locking mechanism, the first receiving portion including a first receiving portion bore, the first locking portion being operatively connected to the first receiving portion and including a first locking portion bore in fluid communication with the first receiving portion bore, the first locking mechanism being positioned within the first locking portion bore and having an engaging position and a releasing position, the first locking mechanism having a first flanged portion extending at least partially into the first receiving portion bore in the engaging position, the first flanged portion configured and arranged to move longitudinally within the first locking portion bore when the first locking mechanism moves between the engaging position and the releasing position; and
    a gate slidably operatively connected to the second end, the gate having a closed position and an open position, the gate spanning the opening and a portion of the gate extending through the first receiving portion bore in the closed position, the gate including a first engaging portion proximate the first receiving portion bore in the closed position, the first flanged portion extending at least partially into the first engaging portion when the gate is in the closed position and the first locking mechanism is in the engaging position to secure the gate to the base, the first flanged portion positioned out of the first engaging portion and positioned in the first locking portion bore when the first locking mechanism is in the releasing position to allow the gate to be moved relative to the base.

2. The connector of claim 1, further comprising a slot extending longitudinally along a portion of the gate and a pin operatively connected to the second end of the base extending into the slot.

3. The connector of claim 1, wherein the first locking mechanism comprises a biasing member, an engaging member, and a fastener, the fastener operatively connecting the biasing member and the engaging member to the first locking portion, the biasing member biasing the engaging member in the engaging position, the engaging member including the first flanged portion.

4. The connector of claim 1, further comprising a notch proximate a distal end of the gate and a ramp portion interconnecting the notch and the first engaging portion, the notch and the ramp portion assisting in sliding the distal end of the shaft past the first locking mechanism when the gate is moved from the open position to the closed position.

5. The connector of claim 1, further comprising the second end including a second receiving portion, a second locking portion, and a second locking mechanism, the second receiving portion including a second receiving portion bore, the second locking portion being operatively connected to the second receiving portion and including a second locking portion bore in fluid communication with the second receiving portion bore, the second locking mechanism being positioned within the second locking portion bore and having an engaging position and a releasing position, the second locking mechanism having a second flanged portion extending at least partially into the second receiving portion bore in the engaging position, the second flanged portion configured and arranged to move longitudinally within the second locking portion bore when the second locking mechanism moves between the engaging position and the releasing position, the gate including a second notch proximate the second receiving portion bore in the closed position, the second flanged portion extending at least partially into the second notch when the gate is in the closed position and the second locking mechanism is in the engaging position to secure the gate to the base, the second flanged portion positioned out of the notch and positioned in the second locking portion bore when the second locking mechanism is in the releasing position, both of the first and second locking mechanisms are positioned in the releasing positions to allow the gate to be moved relative to the base.

6. The connector of claim 5, further comprising a first extension portion including a first ring portion with a first aperture and a second extension portion including a second ring portion with a second aperture, the first and second apertures being aligned with the first and second receiving portion bores.

7. The connector of claim 6, wherein a first opening is formed by the first extension portion and the second extension portion, a second opening is formed by the first receiving portion and the first extension portion, and a third opening is formed by the second extension portion and the second receiving portion.

8. The connector of claim 7, wherein the bar portion is configured and arranged to be operatively connected to a safety harness and the gate is configured and arranged to be operatively connected to a safety device proximate the first opening.

9. The connector of claim 7, wherein the bar portion is configured and arranged to be operatively connected to a safety harness, the gate is configured and arranged to be operatively connected to a first safety device proximate the second opening, and the gate is configured and arranged to be operatively connected to a second safety device proximate the third opening.

10. The connector of claim 1, wherein the first end includes the first receiving portion the first locking portion, and the first locking mechanism.

11. The connector of claim 1, wherein the first receiving portion is operatively connected to the base.

12. The connector of claim 11, wherein the first receiving portion and the base are integral.

13. A connector, comprising:
a base including a first end and a second end forming an opening;
a gate having a shaft slidably operatively connected to the second end and configured and arranged to span the opening; and
a locking member having an engaging position and a releasing position, the locking member being configured and arranged to move in a direction perpendicular to the gate to move between the engaging position and the releasing position, the locking member including a base portion and a flanged portion, the flanged portion configured and arranged to engage the shaft of the gate in the engaging position and secure the gate relative to the base, the base portion being positioned proximate the shaft of the gate in the releasing position allowing the gate to be moved relative to the base.

14. The connector of claim 13, wherein the locking member further comprises a biasing member, an engaging member, and a fastener, the fastener operatively connecting the biasing member and the engaging member to the locking member, the biasing member biasing the engaging member in the engaging position, the engaging member including the first flanged portion.

15. The connector of claim 13, further comprising a first receiving portion bore in the first end, a second receiving portion bore in the second end, a first extension portion including a first ring portion with a first aperture, and a second extension portion including a second ring portion with a second aperture, the first and second apertures being aligned with the first and second receiving portion bores.

16. The connector of claim 15, wherein a first opening is formed by the first extension portion and the second extension portion, a second opening is formed by the first receiving portion and the first extension portion, and a third opening is formed by the second extension portion and the second receiving portion.

17. A connector, comprising:
a base including a bar portion, a first receiving portion, a first locking portion, a first locking mechanism, a second receiving portion, a second locking portion, and a second locking mechanism, the first receiving portion being operatively connected to a first end of the bar portion and including a first receiving portion bore, the first locking portion being operatively connected to the first receiving portion and including a first locking portion bore in fluid communication with the first receiving portion bore, the first locking mechanism being positioned within the first locking portion bore and having a first flanged portion extending at least partially into the first receiving portion bore, the second receiving portion being operatively connected to a second end of the bar portion and including a second receiving portion bore, the second locking portion being operatively connected to the second receiving portion and including a second locking portion bore in fluid communication with the second receiving portion bore, the second locking mechanism being positioned within the second locking portion bore and having a second flanged portion extending at least partially into the second receiving portion bore, a first opening being formed by the first receiving portion and the second receiving portion, the first receiving portion bore being aligned with the second receiving portion bore, the first and second locking mechanisms each having an engaging position and a releasing position, the first and second flanged portions configured and arranged to move longitudinally within the respective first and second locking portion bores when moving between the engaging positions and the releasing positions;

a gate including a head and a shaft, the head being operatively connected to one end of the shaft, the shaft including a distal end opposite the head, the shaft including a first engaging portion proximate the distal end and a second engaging portion proximate the head; and wherein the first and second receiving portion bores are configured and arranged to receive the shaft, the first flanged portion being configured and arranged to engage the first engaging portion in the engaging position and the second flanged portion being configured and arranged to engage the second engaging portion in the engaging position, and wherein both the first and second locking mechanisms are positioned in the releasing positions to move the gate relative to the base.

18. The connector of claim 17, further comprising:
a slot extending longitudinally along a portion of the shaft;
a lateral bore in the second receiving portion; and
a retaining pin extending through the lateral bore and into the slot, the retaining pin acting as a stop to prevent the gate from being completely removed from the base.

19. The connector of claim 17, wherein the first locking portion bore is perpendicular to the first receiving portion bore and the second locking portion bore is perpendicular to the second receiving portion bore.

20. The connector of claim 17, wherein the first and second locking mechanisms each comprise a biasing member, an engaging member, and a fastener, the fastener operatively connecting the biasing member and the engaging member to the respective locking portion, the biasing member biasing the engaging member in the engaging position, the engaging member including the respective flanged portion.

21. The connector of claim 17, further comprising a first extension portion including a first ring portion with a first aperture and a second extension portion including a second ring portion with a second aperture, the first and second apertures being aligned with the first and second receiving portion bores.

22. The connector of claim 21, wherein a first opening is formed by the first extension portion and the second extension portion, a second opening is formed by the first receiving portion and the first extension portion, and a third opening is formed by the second extension portion and the second receiving portion.

23. The connector of claim 22, wherein the bar portion is configured and arranged to be operatively connected to a safety harness and the gate is configured and arranged to be operatively connected to a safety device proximate the first opening.

24. The connector of claim 22, wherein the bar portion is configured and arranged to be operatively connected to a safety harness, the gate is configured and arranged to be operatively connected to a first safety device proximate the second opening, and the gate is configured and arranged to be operatively connected to a second safety device proximate the third opening.

25. The connector of claim 17, further comprising a notch proximate the distal end of the shaft and a ramp portion interconnecting the notch and the first engaging portion, the notch and the ramp portion assisting in sliding the distal end of the shaft past the first locking mechanism.

26. The connector of claim 13, wherein the locking member comprises a first locking member and a second locking member, the first locking member being proximate the first end and the second locking member being proximate the second end, and wherein both the first locking mechanism and the second locking mechanism are positioned in the releasing positions to move the gate relative to the base.

27. The connector of claim 13, wherein the gate is configured and arranged to move relative to the base in a first direction, and the locking member is configured and arranged to move in a second direction, the second direction being perpendicular to the first direction.

* * * * *

UNITED STATES PATENT AND TRADEMARK OFFICE
CERTIFICATE OF CORRECTION

PATENT NO. : 8,938,864 B2  
APPLICATION NO. : 13/660532  
DATED : January 27, 2015  
INVENTOR(S) : Scott C. Casebolt Page 1 of 2

It is certified that error appears in the above-identified patent and that said Letters Patent is hereby corrected as shown below:

In the Claims

In claim 1, column 10, line 57 should read, and a releasing position, --a first biasing member biasing the first locking mechanism in the engaging position;-- the first locking mechanism In claim 3, column 11, line 17 should read, mechanism comprises "a" --the first-- biasing member, an engaging mem- In claim 3, column 11, line 19 should read, --first-- biasing member and the engaging member to the first locking In claim 3, column 11, line 20 should read, portion, the --first-- biasing member biasing the engaging member in In claim 5, column 11, line 38 should read, ing position, and a releasing position, --a second biasing member biasing the second locking mechanism in the engaging position,-- the second locking In claim 13, column 12, line 31 should read, portion and a flanged portion, --the base portion having a smaller diameter than the flanged portion,-- the flanged portion con- In claim 13, column 12, line 35 should read, shaft of the gate in the releasing position --and the smaller diameter of the base portion-- allowing the In claim 17, column 12, line 61 should read, ond locking mechanism, --the first and second locking mechanisms each having an engaging position and a releasing position, first and second biasing members biasing the respective first and second locking mechanisms in the engaging position,-- the first receiving portion being Signed and Sealed this  
Twenty-eighth Day of July, 2015

Michelle K. Lee  
*Director of the United States Patent and Trademark Office*

CERTIFICATE OF CORRECTION (continued)
U.S. Pat. No. 8,938,864 B2

In claim 17, column 13, line 3 should read, bore"," --in the engaging position,-- the second receiving portion being operatively In claim 17, column 13, line 12 should read, into the the second receiving portion bore"," --in the engaging position,-- a first opening In claim 17, column 13, line 15 to line 17 should read, being aligned with the second receiving portion bore, "the first and second locking mechanisms each having an engaging position and a releasing position," the first and In claim 20, column 13, line 47 should read, locking mechanisms each comprise "a biasing member," an In claim 20, column 14, line 1 should read, engaging member"," and a fastener, the fastener operatively In claim 20, column 14, line 2 should read, connecting the --respective-- biasing member and the engaging member to In claim 20, column 14, line 3 to line 4 should read, the respective locking portion, "the biasing member biasing the engaging member in the engaging position" the engaging